UNITED STATES PATENT OFFICE.

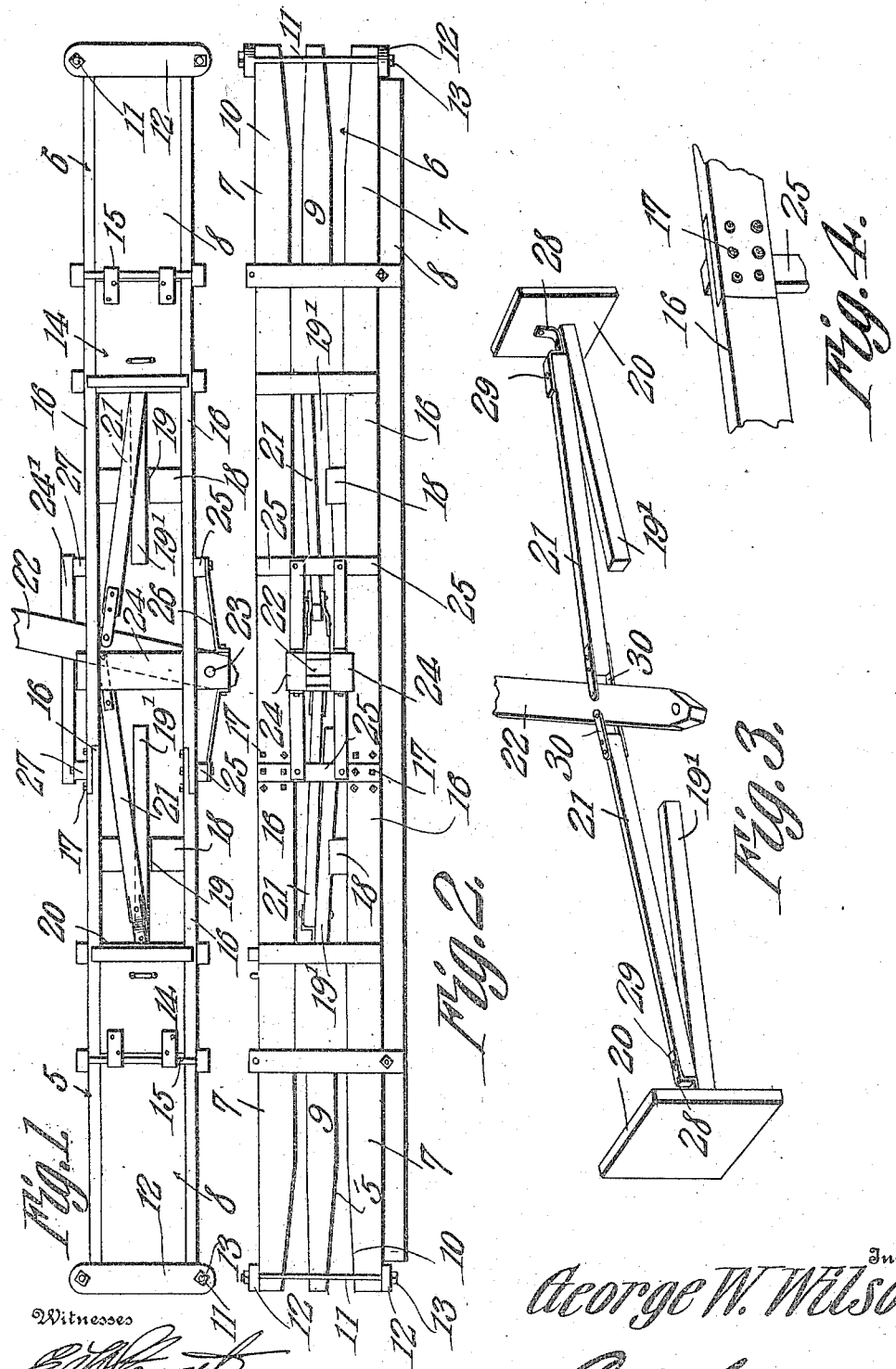

GEORGE WASHINGTON WILSON, OF ARCADIA, LOUISIANA.

HAY-PRESS.

947,877.  Specification of Letters Patent.  Patented Feb. 1, 1910.

Application filed February 8, 1909. Serial No. 476,741.

*To all whom it may concern:*

Be it known that I, GEORGE WASHINGTON WILSON, a citizen of the United States, residing at Arcadia, in the parish of Bienville and State of Louisiana, have invented a new and useful Hay-Press, of which the following is a specification.

This invention relates to hay presses and has for its object to provide a strong, durable and thoroughly efficient device of this character having a double compression chamber, whereby two bales of hay or other material may be formed at each operation of the sweep.

A further object of the invention is to provide a double baling press, the compression boxes of which are detachably united so that the same may be readily disconnected and the machine used as a single acting press.

A further object is to provide improved means for operating the plungers, and means for guiding the sweep as the latter is reciprocated to effect the movement of said plungers.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification:—Figure 1 is a top plan view of a baling-press constructed in accordance with my invention. Fig. 2 is a side elevation of the same. Fig. 3 is a perspective view of the plungers detached, showing the manner of connecting the same with the sweep. Fig. 4 is a detail perspective view showing the manner of connecting the longitudinal sills of the compression boxes.

Similar numerals of reference indicate corresponding parts in all of the figures of the drawings.

The improved baling-press forming the subject matter of the present invention comprises spaced compression boxes 5 and 6 preferably disposed in longitudinal alinement and each formed of upper and lower longitudinal bars 7 connected by transverse top and bottom plates 8.

Interposed between the longitudinal bars of each compression box is a spacing member 9, the free end of which is reduced and interposed between the inclined ends 10 of said bars so as to permit contraction of the outer ends of the compression boxes when it is desired to form bales of different sizes.

The compression at the outer ends of the boxes is effected by tension rods 11 the opposite ends of which pass through suitable perforations in transverse bars 12 secured to the top and bottom plates 8 for engagement with clamping nuts 13.

The top plate 8 of each compression box terminates short of the lower plate thereof to permit the insertion of a door or gate 14, which latter is pivotally mounted at 15 on the adjacent plate 8 so that the latter may be readily swung upwardly to open position to permit the introduction of hay or other material to the interior of the compression box.

The bars 7 are extended longitudinally beyond the compression boxes and are provided with over-lapped terminals 16, the inner ends of which are rabbeted and detachably united by bolts or similar fastening devices 17, whereby the boxes may be readily disconnected and the device used as a single acting press if desired.

Extending transversely across the lower longitudinal bar 7 in advance of the inner ends of the compression boxes are transverse bars 18 having angular guiding recesses 19 formed therein for the reception of the correspondingly shaped rods 19' of the plungers 20.

The plungers 20 reciprocate alternately within the boxes and are each connected through the medium of a pitman 21 with an operating lever or sweep 22.

The sweep 22 is pivotally mounted at 23 between a pair of spaced transverse bars 24 disposed at a point intermediate the compression boxes, while the free end thereof projects laterally beyond the adjacent side of the press and reciprocates on a guiding bar 24', as best shown in Fig. 1 of the drawings.

As a means for reinforcing and strengthening the bars 7 at the pivotal axis of the sweep there is provided a pair of spaced uprights 25, which are rigidly secured to the adjacent longitudinal bars 7 and are also connected through the medium of the inclined braces 26 with the intermediate transverse bars 24. Similar spaced uprights 27 are also preferably secured to the opposite side of the press for connection with the adjacent ends of the longitudinal guide bar 24'.

Secured to the inner face of each piston head or plunger 20 is one end of a strap iron 28, the opposite end of which is secured in any suitable manner to the rods 19' and thence bent upwardly for pivotal connection at 29 with the adjacent pitman 21, the inner ends of the pitman being pivotally connected to the sweep 22 by spaced strap irons 30. Thus it will be seen that when hay or other material is introduced within the press boxes through the door-openings and the sweep 22 reciprocated the plungers 20 will alternately work within the boxes 5 and 6 and compress the material therein so as to permit the formation of two bales at one operation of said sweep. It will also be noted that by removing the fastening devices 17 the longitudinal bars 7 may be readily disconnected so as to convert the machine into a single acting press.

It will of course be understood that the baling presses may be made of a sufficient length to permit changing of the boxes and tying of the bales during the operation of the sweep.

Having thus described the invention what is claimed is:—

1. A baling press including detachably connected compression boxes, plunger heads operating within the compression boxes, transverse bars disposed in advance of the compression boxes and provided with guiding recesses, a plunger connected with said heads and operating within the guides, a sweep pivotally mounted between the compression boxes, and pitmen forming a pivotal connection between the plungers and sweep.

2. A baling press including spaced compression boxes having longitudinally disposed sills, the inner ends of which are over-lapped and detachably connected, spaced bars extending transversely across the longitudinal bars between said boxes, a sweep pivotally mounted between the transverse bars, a guide disposed in advance of each box, plungers slidably mounted in the guides and operating in the compression boxes, and pitmen forming a pivotal connection between the plungers and sweep.

3. A baling press including spaced compression boxes having longitudinal bars, the inner ends of which are over-lapped and detachably connected, transverse strips secured to the upper and lower face of each compression box, tension rods connecting said strips, spaced transverse bars disposed between the longitudinal bars at the center of the press, a sweep mounted for pivotal movement between the transverse bars, auxiliary transverse bars disposed on opposite sides of the spaced transverse bars and provided with guiding recesses, plungers slidably mounted in said recesses and operating within the compression boxes, and a pitman forming a pivotal connection between the plungers and the sweep.

4. A baling press including spaced longitudinally alined compression boxes having their inner ends detachably united, spaced bars extending transversely across the press between said boxes, a sweep pivotally mounted between the transverse bars, plungers operating within the compression boxes, pitmen pivotally connected to the plungers and having their inner ends provided with spaced strap-irons for pivotal connection with the sweep, and straps secured to the plunger heads and pivotally connected with the adjacent ends of the pitman.

5. A baling press including spaced compression boxes having upper and lower longitudinal sills, the inner ends of which are over-lapped and detachably united, vertical strips connecting the longitudinal bars on opposite sides of the press, a pair of transverse bars arranged between said strips, a sweep pivotally mounted between the transverse bars, inclined braces connecting the transverse bars and the adjacent vertical strips on one side of the press, a longitudinal bar connecting the vertical strips on one side of the press and forming a guide for the sweep, plungers operating within the compression boxes, guides disposed on opposite sides of the transverse bars for engagement with the plungers, and pitmen forming a pivotal connection between the plungers and sweep.

In testimony that I claim the foregoing as my own, I have hereto affixed my signature in the presence of two witnesses.

GEO. WASHINGTON WILSON.

Witnesses:
W. M. DEAS,
C. E. BUTT.